United States Patent [19]

Alexandrovich, Sr. et al.

[11] 3,958,273

[45] May 18, 1976

[54] CASSETTE-TYPE HEAD DEMAGNETIZER

[75] Inventors: George Alexandrovich, Sr., Commack; Art Seides, Jericho, both of N.Y.

[73] Assignee: Robins Industries Corporation, Commack, N.Y.

[22] Filed: Aug. 23, 1974

[21] Appl. No.: 500,122

[52] U.S. Cl. .................................. 360/128; 274/47; 317/157.5 R; 360/66
[51] Int. Cl.² ...................... G11B 5/46; G11B 5/41; G11B 23/04
[58] Field of Search ............ 360/128, 130, 66, 105, 360/132; 317/157.5; 274/47; 335/284

[56] References Cited
UNITED STATES PATENTS

| | | |
|---|---|---|
| 3,126,502 | 3/1964 | St. Denis.......................... 335/284 |
| 3,351,717 | 11/1967 | Metz................................ 360/128 |
| 3,647,990 | 3/1972 | Eul, Jr. et al. .................... 360/128 |
| 3,655,924 | 4/1972 | Puskas.............................. 360/128 |
| 3,810,230 | 5/1974 | Orolowski et al................... 360/128 |

*Primary Examiner*—Alfred H. Eddleman
*Attorney, Agent, or Firm*—Michael J. Striker

[57] ABSTRACT

A cassette-type demagnetizer for magnetic heads of tape-recording and/or playback units has a housing provided with an open side which is juxtaposed with a magnetic head of a unit when the demagnetizer has placed onto the latter. A rotatable tape supply hub and a rotatable tape take-up hub are located in the housing and can be driven by drive spindles of the unit. A tape is convoluted onto the supply hub and is withdrawn from the same and convoluted onto the take-up hub when the latter is rotated. A circular permanent magnet is rotatably mounted in the housing adjacent the open side of the latter and the tape is trained about it in order to rotate the magnet as the tape travels, so that an alternating magnetic field is produced which demagnetizes the head of the unit. A shielding arm of soft iron is pivotably mounted in the housing and is urged into engagement with the periphery of the take-up hub by a biasing spring. The arm has an end portion which progressively moves between the circular permanent magnet and the open side of the housing, in order to progressively reduce the magnetic field to zero, as the amount of tape on the take-up hub increases and the diameter of the hub and tape package thereon therefore also increases and urges the arm in direction opposite to the biasing force of the spring.

8 Claims, 2 Drawing Figures

CASSETTE-TYPE HEAD DEMAGNETIZER

BACKGROUND OF THE INVENTION

The present invention relates generally to a demagnetizer for magnetic heads, and more particularly to a cassette-type demagnetizer for the magnetic heads of tape-recording and/or playback units.

The most widely used magnetic tape system is the one developed by the Phillips Corporation of Holland, the so-called "cassette" tapes which incorporate a take-up and a supply hub in a small cassette housing which housing can be readily placed into a tape-recording and/or playback unit so that the hubs become engaged by the drive spindles of the unit to effect transfer of tape from the one to the other of these hubs.

The recording of signals on magnetic tapes and the retrieval of signals for subsequent playback, is carried out in tape-recording and/or playback units by means of magnetic heads whose construction is well known. All such heads, including those in units which are specifically intended for use with tape cassettes, acquire residual magnetism over a period of time. Unless these heads are demagnetized or degaussed, the residual maagnetism will cause noise and distortion during recording and/or during playback.

Various head demagnetizers are already known from the art, including demagnetizers for use with tape-recording and/or playback units that use tape cassettes. However, they are all relatively complicated in construction and most of them require external electrical power for their operation.

What is not heretofore known from the art is a simple cassette-type demagnetizer which requires no external power, and which has the further capability of not only demagnetizing the tape head of a unit with which it is to be used, but also of cleaning residual contaminant particles, such as oxide particles, which inevitably adhere to the recording-tape contacting surfaces of these heads.

SUMMARY OF THE INVENTION

It is, accordingly, an object of the present invention to provide such a demagnetizer which overcomes the aforementioned disadvantages and provides the soughtafter benefits.

More particularly, it is an object of the present invention to provide a cassette-type demagnetizer for magnetic heads of tape-recording and/or playback units.

Another object of the invention is to provide such a demagnetizer which is simple in its construction and completely uncomplicated in its operation.

An additional object of the invention is to provide such a demagnetizer which in addition to demagnetizing the magnetic head or heads of a unit can also physically clean contaminants from them.

In keeping with these objects and with others which will become apparent hereafter, one feature of the invention resides in a cassette-type demagnetizer for magnetic heads of tape-recording and/or playback units, which, briefly stated, comprises a housing having an open side adapted to be juxtaposed with a magnetic head of the unit. A rotatable tape supply hub and a rotatable tape take-up hub are located in the housing and engageable with drive spindles of the unit. A tape is convoluted on the supply hub and adapted to be withdrawn from the same and to be convoluted onto the the take-up hub in response to rotation of the latter. A circular permanent magnet is rotatably mounted in the housing adjacent the open side thereof so as to be located opposite the magnetic head of the unit with which the demagnetizer is being used. The tape is trained about the magnet to rotate the same as the tape is transferred to the tape-up hub, so that an alternating magnetic field is produced for demagnetizing the head of the unit. Shielding means is provided, responsive to the transfer of the tape from the supply hub to the take-up hub, for progressively reducing the magnetic field to zero during such transfer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
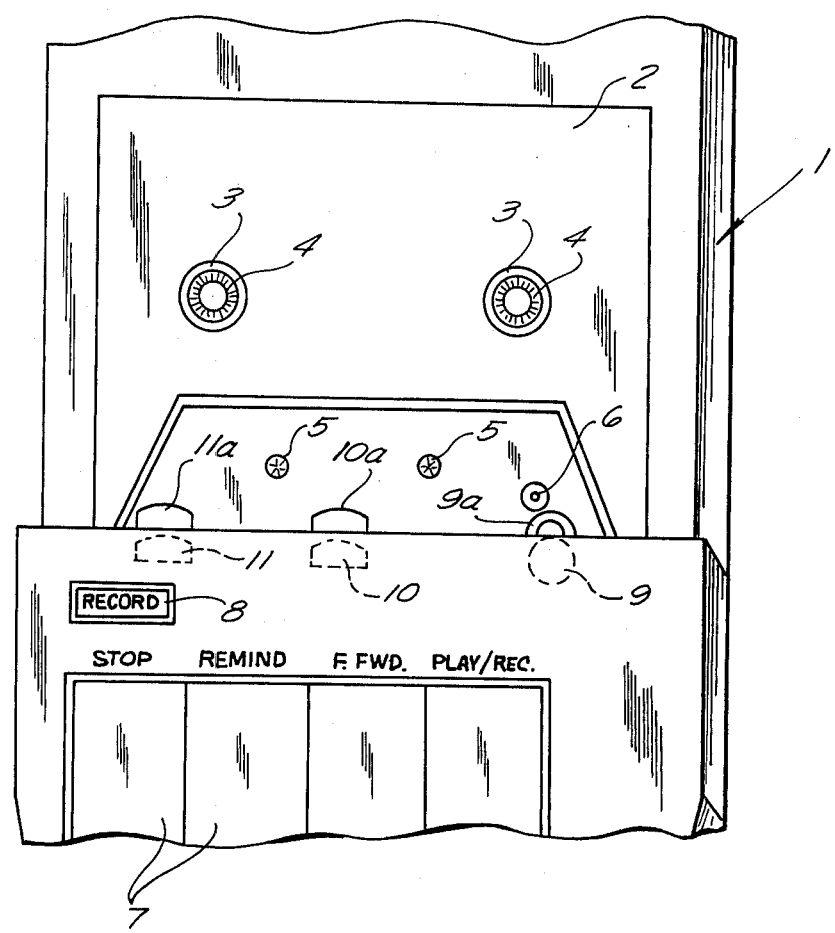
FIG. 1 is a fragmentary top-plan view illustrating an exemplary tape-recording and/or playback unit with which the demagnetizer of the present invention can be used.

Referring now in particular to FIG. 1 it will be seen that we have illustrated in this Figure a unit 1 of the type which normally uses a tape cassette for recording and/or playback. Such units have a depression or recess 2 dimensioned to receive the housing of a tape cassette (not shown). The body of the unit is provided with cutouts or openings 3 communicating with the interior of the unit and through which drive spindles 4 extend which then engage into hubs of the tape cassette housing to rotate these hubs when the drive spindles 4 are rotated by the internal mechanism of the unit 1. No details of the mechanism are needed for an understanding of the invention which will be described with reference to FIG. 2.

A pair of locating pins 5 is provided which extends into holes provided for this purpose in the tape cassette housing, so as to hold the latter in place. The housing is provided with an additional hole or holes into which a back-up spindle 6 extends which is mounted in the unit 1 and which, when it extends into the appropriate hole of the tape cassette housing will become located behind the advancing tape in the latter.

Push buttons 7 are provided for selecting the various operational modes as indicated, that is stop, rewind, fast forward and play/record. No details of the internal structure associated with the push buttons 7 is required, because this is not part of the invention and in any case is too well known to require such description. Reference numeral 8 identifies an interlock recording button which is provided in those of these units to assure that accidental erasure of a program is prevented.

A driven capstan 9 is provided, as well as a recording and/or playback head 10 and a tape-tensioner 11. These components 9 – 11 are normally (when the unit is not in use) retracted to their broken line positions as shown. When the play-record button 7 is depressed, the components 9 – 11 are caused to move out to their full line positions and into the open side of a tape cassette that is in place in the recess 2. The tape tensioner 11 engages in its position 11a the tape which passes in the cassette past the open side, the recording head 10 engages in the position 10a the tape to record or play back, and the capstan 9 engages in its position 9a the tape and presses it against the spindle 6, so that a nip is formed in which the tape is positively advanced by the rotation of the capstan 9. The spindle 6 of course serves as a back-up so that the capstan 9 can press the tape against it.

The description of the unit in FIG. 1 has been provided merely for background purposes. The actual invention is illustrated in FIG. 2.

Figure 2:
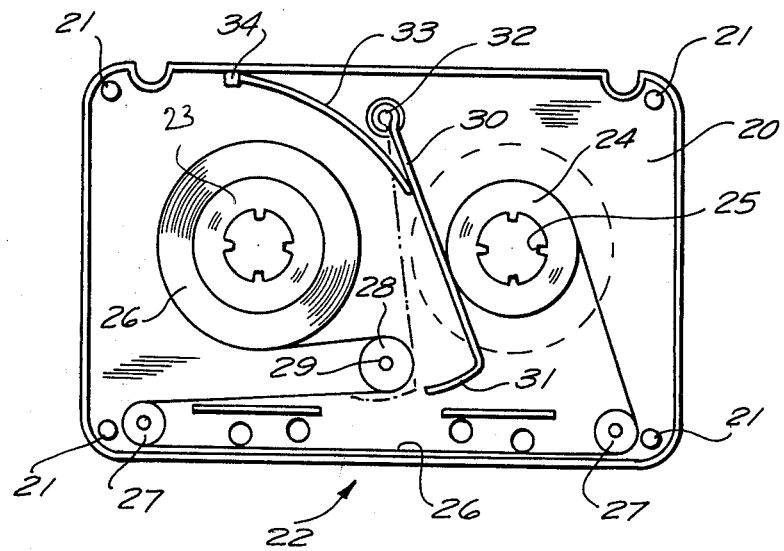
FIG. 2 is a top-plan view of a demagnetizer according to the present invention, with the top of the housing removed to show the interior.

FIG. 2 shows a magnetic head demagnetizer or degausser according to the invention. Reference numeral 20 identifies the lower half of a housing which is configurated in all respects in the same manner as a normal tape cassette housing. Reference numerals 21 identify pins which engage with the cooperating portions in the upper part of the housing, which has been omitted in FIG. 2 in order to be able to illustrate the interior mechanism.

The open side of the housing is identified with reference numeral 22. Rotated in the housing are the conventional tape supply hub 23, takeup hub 24, each having teeth 25. When the housing 20 is placed into the depression 2 in lieu of a conventional tape cassette, the spindles 4 will enter into the holes of the hubs 23, 24 and mesh with the teeth 25 so that when the righthand spindle 4 is rotated in counterclockwise direction (as it always is when the unit is either in playback mode or recording mode), the hub 24 will rotate with it. A tape 26 is connected with its opposite ends to the hubs 23 and 24 and is convoluted onto the hub 23 to form a package thereon. The tape 26 will be withdrawn from the hub 23 and wound onto the hub 24 until it forms a package the outline of which is identified in broken lines about the hub 24.

The tape 26 is trained about a pair of idler rollers or guide rollers 27 so that a portion of the tape is made to past the open side 22 of the housing 20. In addition, the tape 26 is convoluted about a circular permanent magnet 28 which is mounted opposite the open side 22 for rotation about a shaft or pin 29. The tape 26 therefore frictionally entrains and rotates the circular magnet 28 when the tape is withdrawn from one hub and wound onto the other.

Also located in the housing is an arm 30 which serves magnetic shielding purposes and may therefore be of soft iron. The arm 30 has a free end provided with a transversely projecting portion 31; at its opposite end the arm 30 is mounted for pivoting movement about a pin 32. It is permanently urged into engagement with the circumference of the take-up hub 24 by a bzasi5g spring 33 which is fixedly connected to the housing at 34. Evidently, a component other than a spring could be used for biasing purposes.

The device of FIG. 2 is placed into a unit 1 whose head or heads 10 are required to be demagnetized, in such a manner that the take-up hub 24 will receive the right-hand drive spindle 4 that is the one which rotates in counterclockwise direction when the device 1 is placed into playback or recording mode. At start of operations, the tape 26 is completely convoluted onto the hub 23. When the playback mode or recording mode is now selected for the unit 1, the hub 24 will rotate in counterclockwise direction and will withdraw tape 26 from the hub 23. The tape 26 rotates the magnet 28 as it travels around the same, and the rotation of the magnet produces an alternating magnetic field which is directed toward the tape recorder head 10 that is located opposite the magnet 28 (compare FIG. 1) and creates a variable sinusoidal magnetic field in the tape head, thereby demagnetizing the latter.

As the diameter of the tape package 26 on the take-up hub 24 increases, it begins to push the arm 30 about the pivot 32 in clockwise direction so that the portion 31 moves to an ever greater degree in front of the magnet 28. In so doing it progressively decreases the magnetic field created by the rotating magnet 28 until the portion 31 is located completely in front of the magnet 28, as indicated by the broken-dash line shown. This occurs when the tape 26 is fully wound onto the hub 24, at which time the arm 30, 31 has reduced the flux to unmeasurable level, that is to zero.

The entire operation takes approximately 30 seconds since it is merely necessary to place the housing 20 into the unit 1 and to press the playback or recording button 7 thereof, letting the unit 1 operate until the tape stops at which time all of the tape 26 will have been wound onto the hub 24 and the magnet 28 will have demagnetized the head 10. The housing 20 is then either removed from the machine and put away until it is required again, or else the tape 26 can be immediately rewound onto the hub 23 so that the unit is ready for the next use.

The tape 26 could also be guided in a different manner than illustrated, as long as it is convoluted around the magnet 28 and serves to rotate the same. It is, however, advantageous to guide the tape 26 past the open side 22 so that it can wipe or slide over the surface of the recording head or playback head 10 in order to remove any particulate contaminants that may adhere to this surface. For this purpose it is advantageous if the tape 26 has a somewhat rough surface, so as to have some abrasive quality and wipe off oxide particles or the like that may adhere to the surface of the head 10. Tapes of this type are already well known and commercially available as "head cleaning tapes".

The device according to the present invention will be seen to be extremely simple, requiring no expertise whatsoever on the part of the user. He merely inserts it into this unit 1 in the same manner in which he would insert a magnetic tape cassette, and subsequently removes it and places it away for storage until he requires it again. Moreover, the device according to the present invention makes it possible to reduce the alternating magnetic field which serves for degaussing or demagnetizing of the head 10, gradually to zero without having to move the magnet 28, and it does not require external power to produce the magnetic field. In addition to this, the device according to the present invention of course can be used, as outlined above, to actually clean the head 10 by means of the tape 26.

It will be understood that each of the elements described above, or two or more together, may also find a useful application in other types of constructions differing from the types described above.

While the invention has been illustrated and described as embodied in a cassette-type head demagnetizer, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cassette-type demagnetizer for magnetic heads of tape-recording and/or playback units, comprising a housing having an open side adapted to be juxtaposed with a magnetic head of the unit; a rotatable tape supply hub and a rotatable tape take-up hub in said housing and engageable with drive spindles of the unit; a tape convoluted on said supply hub and adapted to be withdrawn from the same and convoluted onto said take-up hub in response to rotation of the latter; a circular permanent magnet; means for rotatably mounting said magnet in said housing adjacent said open side for rotation about a stationary axis so as to be located opposite the magnetic head of the unit, said tape being trained about said magnet to rotate the same as said tape is transferred to said take-up hub, so that an alternating magnetic field is produced for demagnetizing the head of the unit; and shielding means responsive to the transfer of said tape from said supply hub to said take-up hub, for progressively reducing said magnetic field to zero during such transfer.

2. A demagnetizer as defined in claim 1, wherein said tape is a head-cleaning tape having an abrasive surface; and further comprising guide means for guiding said tape past said open side so that the tape wipes over and cleans the head being demagnetized during transfer of the tape to said take-up hub.

3. A demagnetizer as defined in claim 1, wherein said magnet and said magnetic head define a constant gap therebetween.

4. A demagnetizer as defined in claim 1, wherein said shielding means comprises a pivotally mounted arm in said housing and having a shielding portion, and biasing means biasing said arm into contact with the periphery of said take-up hub, said arm being pivotable in response to an increase in the diameter of the take-up hub which results from transfer of the tape onto the latter, so that said shielding portion becomes progressively interposed between said circular magnet and said open side.

5. A demagnetizer as defined in claim 4, wherein said shielding portion is of soft iron.

6. A demagnetizer as defined in claim 4, wherein said biasing means comprises a biasing spring.

7. A demagnetizer as defined in claim 4, wherein said magnet and said magnetic head define a constant gap therebetween; and wherein said arm pivots said shielding portion between a first non-shielded position in which said shielding portion is remote from said gap and a second fully-shielded position in which said shielding portion extends across said gap.

8. A demagnetizer as defined in claim 7, wherein said arm pivots said shielding portion through intermediate positions between said first and said second positions in which said shielding portion progressively extends across said gap.

* * * * *